United States Patent [19]

Dietzler

[11] Patent Number: 4,650,367
[45] Date of Patent: Mar. 17, 1987

[54] INTERNALLY REINFORCED EXTRUDED PLASTIC PIPE

[76] Inventor: Daniel P. Dietzler, 21 W. 505 Acorn Ave., Glen Ellyn, Ill. 60137

[21] Appl. No.: 836,806

[22] Filed: Mar. 6, 1986

Related U.S. Application Data

[60] Division of Ser. No. 556,416, Nov. 30, 1983, Pat. No. 4,596,491, which is a continuation of Ser. No. 360,621, Mar. 22, 1982, abandoned.

[51] Int. Cl.⁴ .............................................. F16L 1/00
[52] U.S. Cl. .................................... 405/43; 138/172; 405/45; 405/154
[58] Field of Search ............... 405/154, 43, 45, 48; 138/105, 172, 174, 176, 177, 111, 114, 115

[56] References Cited

U.S. PATENT DOCUMENTS

| | | | |
|---|---|---|---|
| 2,196,708 | 4/1940 | Reid | 138/115 |
| 2,340,926 | 2/1944 | Bradley | 138/115 |
| 2,743,960 | 5/1956 | Kamin | 138/115 |
| 3,038,396 | 6/1962 | Jameson et al. | 405/43 X |
| 3,080,124 | 3/1963 | Rathmann | 405/45 X |
| 4,016,727 | 4/1977 | Osaka et al. | 138/115 |

FOREIGN PATENT DOCUMENTS

| | | | |
|---|---|---|---|
| 773584 | 11/1934 | France | 138/115 |
| 964069 | 8/1950 | France | 138/115 |
| 1129788 | 1/1957 | France | 138/115 |

Primary Examiner—Dennis L. Taylor
Attorney, Agent, or Firm—Lee, Smith & Zickert

[57] ABSTRACT

An internally reinforced extruded plastic pipe which is adapted for use as an underground infiltration, collection, or transport conduit for liquids and gases. The pipe is provided with at least one integral reinforcing stem and the critical mode of failure is buckling rather than deflection. The pipe is not dependent upon surrounding backfill for lateral support as with conventional pipe or conventional reinforced pipe. The same amount of plastic is usable per lineal unit as is used in comparable conventional pipe sizes, however, the cross-section is redistributed, which achieves greater loading capacity.

21 Claims, 10 Drawing Figures

INTERNALLY REINFORCED EXTRUDED PLASTIC PIPE

This is a division of application Ser. No. 556,416, filed on Nov. 30, 1983, now U.S. Pat. No. 4,596,491, which was a continuation of application Ser. No. 360,621, filed on Mar. 22, 1982, now abandoned.

BACKGROUND AND SUMMARY OF THE INVENTION

The invention relates to buried plastic conduit having internal reinforcement which changes the critical mode of failure from deflection to buckling, and increases load capacity over conventional plastic pipe. The amount of material per lineal foot used in a comparable conventional pipe size is the same but the cross-section is redistributed to achieve increased loading capability.

The primary areas of application include highway and roadway sub-drainage, water supply and monitoring well screens, heat sinks, leachate collection and methane gas collection at landfill sites, and as a conduit for the underground transport of gases and liquids free of solids.

Conduits are typically considered to include small tubes with inside diameters of a fraction of an inch up to conduits tens of feet in diameter, such as used for penstocks in hydro-electric plants. Most pipes are circular or oval in cross-section, however, a variety of cross-sections have been produced. Most pipe cross-sections are circular for the following reasons:

1. Fluids and gases under pressure exert equal (isotropic) loads in all directions;
2. A circular cross-section minimizes friction losses;
3. The volume of the material required in the manufacture of the pipe compared to cross-sectional open area is most efficient;
4. Relative ease of manufacture of thin gauge steel, concrete, and clay, pipe into a circular or oval cross-section;
5. Elimination of stress concentrations; and,
6. Flexibility in installation procedures.

Conduits have been fabricated in various shapes including circular, elliptical, rectangular, horseshoe, and other widely used configurations, as required to meet a specific application and as available manufacturing processes permit. Depending upon the material, the methods of manufacture primarily include: rolling; casting; extrusion; welding; and, molding. The conduit of the invention is limited to conduit cross-sections which can be formed by the extrusion process. Extruded polyvinyl chloride plastic pipe is a common product today. Extrusion of PVC plastic into a pipe cross-section was first accomplished many years ago. In recent days, the popularity of PVC for pipe has rapidly grown and reflects its wide range of applications.

Collection conduits are classified herein as those conduits which include perforations, slots or porous walls to allow fluids to pass through the pipe sidewall. Infiltration conduits are similar to collection conduits in that the fluid flows out of the pipe through perforations in the pipe sidewall. Collection conduits also function as transporting conduits permitting collected fluid to be conveyed to some other point along the pipe. Collection pipes include the following:

1. Water supply and monitoring well screen;
2. Leachate collection pipes;
3. Methane gas collection pipes;
4. French drains; and,
5. Foundation and pavement underdrains.

Infiltration conduits include the following:

1. Septic field disposal conduit;
2. Injection well screen;
3. Dry well screen; and,
4. Air injection system pipes.

Collection conduits are usually encased in a filter to separate the liquids and gases from solids. The conduit walls may or may not be required to function as the filter. Typically filters for collection pipes include the following:

1. Graded sand and gravel mixtures placed in holes and trenches surrounding the pipe;
2. Geotextiles wrapped around the pipe; and,
3. The pipe openings themselves may be sized to act as a filter, for example a water well screen.

Collection and infiltration conduits differ from transport or conveyance conduits, as the terms are used in the industry, in that the fluid pressure inside the conduit is negligible in comparison to the external load on the pipe. Collection and infiltration conduits are generally buried in the soil, bedrock, or other granular material, where the stresses on the outside of the conduit may be anisotropic or isotropic depending on the orientation of the conduit. Collection and infiltration conduits are also installed in bodies of water, where stresses are isotropic.

Transport conduits include underground pipelines, culverts, tubes, sewers, and tiles conveying gases, liquids and liquid/solid slurries. These conduits differ from collection and infiltration conduits because the sidewalls are impermeable and also the physical design stress for most pressurized transport conduits is the internal fluid or gas pressure. Nearly all plastic pipe is rated for a fluid pressure mainly because burst pressure has been an important factor in the utilization of plastic pipe for such applications.

Culverts and sewers are generally not designed for burst pressure but are designed for gravity flow. A primary consideration is the ability of the pipe to convey liquids containing solids without deposition and clogging. The ability to clean and maintain these types of conduits nearly always dictates that the circular or oval cross-section be used. Other pressurized conduits must from time to time be cleaned with "pigs" to remove scale and bacteria and necessitate the use of circular cross-section for such maintenance.

Many conduits used for the transport of gases and liquids, free of solids, do not however require a circular or oval cross-section. Collection conduits, which incorporate a properly designed filter, convey only liquids. Collection conduits that are subject to clogging and require periodic maintenance are technically failures due to inadequate filter design. Properly designed collection conduits should be maintenance-free and therefore need not maintain a circular cross-section. Similarly, many transport conduits, if clogged, could not be cleared without damaging the pipe in the process. Certain pipe installations simply make maintenance procedures impossible due to inaccessibility.

The present invention includes the utilization of non-circular conduits for those applications where a circular cross-section is not needed for efficient functioning of the pipe. As noted in the foregoing, there are certain benefits inherent in a circular cross-section. However, although horizontally buried pipe with a circular cross-section is effective in resisting both internal and external isotropic stresses, it is yet subject to failure due to anisotropic loading of the surrounding soil. Particularly, when the stress relaxation, or well-known "creep phenomenon" of plastics is considered, the use of a circular cross-sectional area to resist anisotropic loading is a serious design factor. It is accordingly the primary goal of the invention to provide a modified, or redistributed, cross-sectional area for an extruded plastic pipe capable of sustaining increased loading beyond conventional circular cross-sections for the unique loading conditions imposed by underground burial.

Tubing is generally designed to withstand internal pressures without deformation or bursting. Large conduits supported by brackets, pipe racks and piers, are designed with primary consideration for deflection between supports. Submerged and buried pipelines are designed for external pressures induced by the earth load, or in the case of submerged pipe, the hydraulic load. Shallow buried conduits are designed with live-loading as a primary consideration and typically would involve truck and rail traffic, construction equipment wheel loads, and intermittent surcharges due to stockpiled materials. Although internal pressure may be given consideration in the design of buried and submerged pipes, the external loading condition is the critical design criterion.

To achieve reliability and longevity, resistance to the buildup of scale, abrasion, rust, and attack from corrosive groundwater, as well as attack from fluids to be transported, are also necessary considerations in the selection of conduit material.

Polyvinyl chloride, high density polyethylene, and acrylonitrile butadiene styrene, are widely used plastics which achieve good to excellent resistance to commonly encountered chemicals in underground burial applications. Typical of these chemicals are the following: municipal waste by-products including heavy metals and materials with high BOD content; strong and weak mineral acids; oxidizing acids, alkalies; alchohols; ketones; esters; and, vegetable, animal and mineral oils.

The clear-cut approach for the design of a pipeline includes selection of the least expensive pipe material which provides the required resistance to attack from specific chemicals to be conveyed in addition to the resistance to the corrosive environment in which the conduit is to be buried. For example, where drinking water is to be conveyed, the resistance to natural salts and the resistance to rust would be considerations in pipe selection. The acidity of the soil environment must also be taken into account.

Currently available flexible plastic pipe, unless placed in a well compacted granular backfill, is subject to excessive deflections and creep. The dependency on proper bedding for long term successful performance has been a major drawback to the wider application of buried plastic pipe. Less apparent aspects of plastic pipe burial have limited its usage. These include: the capacity of the pipeline to adequately function despite human error in installation; loss of soil support, especially laterally in conventional designs; and, the general capability or vulnerability, of the pipeline to unforeseen chemical, temperature and loading changes in the surrounding environment.

The external pressure on submerged pipeline is directly related to the hydraulic head above the pipe and may conveniently be determined knowing the height above the pipe and the density of the fluid. The fluid pressure acting on the exterior surface, or sidewall, of the pipe acts essentially equally in all directions. Failure of a conduit subjected to exterior hydraulic forces is by collapse of the pipe wall through buckling. On occasion, rapid de-watering of a conduit, with the resulting negative fluid pressure (vacuum), has caused collapse. A circular cross-section is effective in resisting external hydrostatic forces, but only up to a point.

Buried pressurized conduits are less affected by external soil loads than are gravity flow conduits. Gravity flow conduits include sewers, culverts and nearly all collection and infiltration pipes. Whereas most buried pressurized pipeline may be subjected to the full external soil load at the time they are empty, gravity flow conduits are subjected to the full external soil load continuously.

Buried pipes oriented in the vertical direction, for example well screens and well casings, experience stress in a similar fashion to submerged pipes, i.e., nearly isotropic external loading. At commencement of pumping, the load on the well casing increases as the well casing is de-watered. Unequal packing of materials surrounding well screen can result in stress concentrations which may lead to collapse if improperly designed. Plastic well screens are particularly vulnerable to failure by excessive deformation because they are dependent upon the annular backfill space therearound for support.

Horizontally buried pipelines are subjected to anisotropic earth pressures. Theories advanced in the science of soil mechanics are supported by actual measurements and indicate that the vertical pressure from earth loading on a horizontal plane is approximately twice the horizontal pressure on a vertical plane at the same depth below the ground surface. In fluid media pressures are isotropic and act equally in the horizontal and vertical directions at a particular depth. The horizontal pressure at a particular depth is always lower than the vertical load in a soil medium. In the case of free-draining granular materials, for example sand and sand-gravel mixtures commonly used for pipe bedding and backfill, the horizontal earth pressure used for design analysis is approximately 0.3 to 0.5 times the vertical load pressure. In the case of highly compacted clays the horizontal earth pressure approaches 0.7 times the vertical earth pressure. However, pressure required to produce lateral deformation is approximately one to five times the vertical soil pressure at any level. The passive earth pressure (resistance to lateral deformation) of granular backfill, may reach a value of almost five times the vertical soil pressure, and is directly responsible for the well-recognized ability of flexible conduits to resist deformation when embedded in granular backfill.

Flexible conduits, including thin gauge corrugated metal pipe, corrugated and non-corrugated thermoplastics, including PVC and high density polyethylene with an elliptical or circular cross-section, are significantly different from rigid buried conduits. The rigid buried conduit carries, or structurally supports, the overlying soil load. The flexible conduit transfers the vertical load on the conduit through the pipe section to the pipe bedding. The mode of failure for rigid pipes is collapse by excessive tension developed in the sidewall of the pipe. The mode of flexible pipe failure is excessive deflection. The passive resistance of the pipe bedding and backfill is the most critical factor in the resistance of a flexible pipe to deflection and failure. A minimum pipe strength is required to transfer the vertical load to the bedding and is termed the pipe ring stiffness. Beyond the minimum ring stiffness, the deflection of a flexible buried conduit is entirely dependent upon the passive resistance afforded by the pipe bedding and backfill.

The pipe bedding and backfill mass must be statically stable. Static stability of bedding and backfill is very similar to that encountered with a spread footing supporting an above-ground structure. At some point the pipe bedding and backfill "structure" must be supported by the surrounding natural soil or fill. In the case where a pipe bedding and backfill are located in a trench, the passive resistance of the trench sidewalls is the effective foundation for the bedding and backfill. In theory, at a certain loading, namely the passive soil pressure, the trench walls would fail to resist the load imposed by the backfill and bedding "structure".

Flexible buried conduits are commonly positioned in either a projecting mode or trench mode for use in landfills. A so called positive projecting mode of pipe burial disposes the pipe in a mounded backfill above the base of the landfill. The trench mode places the pipe below the base within a trench where the sidewalls of the trench support the bedding and backfill placed around the pipe. In the case of a positive projecting burial, the surrounding backfill must extend far enough beyond the zone of the pipe influence so that the backfill itself does not become unstable. In a projecting mode a bearing capacity-type failure of the backfill is a potential manner of failure.

Rigid conduits include clay tile, cast-iron pipe, concrete pipe, and other conduits which are brittle in nature, fail by collapse at low strain. Rigid pipes of a circular cross-section, are subjected to greater vertical earth pressures than flexible pipes buried at the same level. The rigid pipe is not only subjected to the above loading, but because of its rigidity in the elastic soil medium, an additional vertical soil load is transferred to the pipe. The soil load transferred to a rigid conduit may be several times that imposed on a flexible conduit with a compressibility equal to the adjacent soil. The use of a highly compacted well-graded backfill, with low settlement potential, has been used to minimize the potential for disproportionate settlement between the backfill and the rigid pipe. Under ideal conditions the pipe bedding and backfill should have equal settlement characteristics.

The performance of rigid buried conduits, beyond a certain depth of burial and vertical external loading, depends entirely upon the pipe bedding characteristics. Essentially, once the peak crushing strength, i.e., the resistance to the imposed loading, is exceeded, higher and higher quality gradation and compaction of backfill must be used to effectively limit the load carried by the conduit. Clearly, the more stringent the construction requirements are for backfill the higher the cost of pipe installation becomes and a greater potential for failure exists. Alternatively, increasing the pipe wall thickness will combat increased vertical loads. The use of steel reinforcing and thick walls are obvious measures to provide increased strength for pre-cast concrete conduits.

Flexible conduits are dependent on backfill characteristics but in a different respect than with rigid pipe. Effective design of flexible buried conduits considers the minimum ring stiffness which will act to transmit the vertical load on the pipe to the passive resistance afforded by the pipe bedding and backfill. Recent developments in flexible pipe design have included various techniques to improve the ring stiffness of the pipe material. Among these efforts are corrugated high density polyethylene pipe (HDPE), mortar composition pipe, spiral wall stiffeners, truss wall pipe and corrugated PVC. Each of these pipe wall configurations is designed to improve the ring stiffness of the section by raising the moment of inertia of the pipe section.

In many applications, buried perforated collection and infiltration conduits, constructed of PVC and HDPE, have been used instead of typical porous-wall concrete pipe, open-spaced clay tile, and perforated corrugated metal pipe designs. Perforations consisting of saw-cut slots or drill holes are particularly suitable for plastic pipe. The ease and relative cost of forming the perforations is particularly advantageous in comparison with other pipe materials. For example, this ability to form very thin slots at regular intervals has a definite economic advantage over stainless steel well screens, which have been replaced with slotted PVC pipe for many shallow burial applications. However, there are limitations imposed by the reduction in ring stiffness due to the incorporation of perforations in the pipe wall. The minimum ring stiffness required to resist deep soil burial limits the open area, i.e., perforations, and limits the flow of water into the pipe. This has been a major drawback to increased usage of plastic well screen.

Since reduction of ring stiffness results from perforating pipe walls and tends to reduce the load carrying capability of buried flexible conduits, recent approaches to the problem have attempted to account for this load carrying reduction and have recommended that the design load arbitrarily be increased proportionately to the percentage of reduction in pipe wall area. This approach accounts for the loss in ring stiffness. Buried flexible pipe deflection can be calculated by the widely used Iowa, or Spangler, equation and is presented together with suggested values for its various constants in the 1970 edition of the *American Society of Civil Engineers (ASCE) Manual and Practice,* No. 37, Chapter 9, Section E, Subsection 1, as follows:

$$\Delta y = De \frac{KWr^3}{EI + 0.061 E'r^3}$$

Where:
$\Delta y$ = horizontal and vertical deflection of the pipe (in)
$De$ = a factor generally taken at a conservative value of 1.5, compensating for the lag or time dependent behavior of the soil/pipe systems (dimensionless)
$W$ = vertical load acting on the pipe per unit of pipe length (lb/in)
$r$ = mean radius of the pipe (in)
$E$ = modulus of elasticity of the pipe materials (psi)
$E'$ = modulus of passive soil resistance (psi) (normally estimated to be 300 psi for soils having Proctor density of 65%, and 700 psi for soils of Proctor density of at least 90%)
$K$ = bedding constant reflecting the support the pipe receives from the bottom of the trench (dimensionless) (a conservative value generally taken to be 0.10)
$I$ = moment of inertia of pipe wall per unit of length (in $^4$/in); for any round pipe, $I = t^3/12$, where $t$ is the average thickness (in).

The term EI in Spangler's equation reflects the pipe's contribution to the total resistance to deflection under load offered by the pipe/soil system. This term, known as the pipe stiffness factor, or ring stiffness, is related to the pipe behavior under parallel plate loading in accordance with ASTM D 2412, "External Loading Properties of Plastic Pipes by Parallel Plate Loading", by the following expression:

$$EI = 0.149r^2 (F/\Delta y)$$

Where:

E,I and r are as previously defined
F=the recorded load (lb/lineal inch) required to produce a pipe deflection Δy
Δy=pipe deflection (in).

The increase in deflection resulting from lower ring stiffness is apparent from these design equations. It would be desirable to increase the perforated area without the resulting ring stiffness loss imposing such a drastic effect in reducing the loading limit for deflection failure of plastic pipe. In that the design of conventional flexible pipe is controlled by deflection failure, as shown by the above equations, the invention primarily involves changing the mode of critical failure from deflection to buckling, which minimizes reliance on ring stiffness.

With the change from the outmoded open-jointed clay tile and porous wall rigid concrete pipe to modern-day perforated and slotted flexible plastic pipe, the role of the bedding/backfill in the installation of these pipes has changed in yet another manner. The corrosion resistance inherent in plastic pipe may well be negated in some cases by the dependence of pipe performance on the granular backfill where the backfill itself may be subject to attack by acid groundwater. This problem has been found in the design of leachate collection systems for solid waste and hazardous waste disposal systems in areas where carbonate rock is the only type of aggregate readily available. This rock is exceedingly susceptible to acidic groundwater attack. It may dissolve and leave the buried flexible conduit without lateral support. Accordingly, it is a significant goal of the invention to provide an internally reinforced plastic conduit which is not reliant upon the structural properties of the surrounding backfill to prevent failure.

Moreover, it is a concomitant goal of the invention to provide an internally reinforced plastic pipe in which the critical mode of failure is buckling rather than deflection and whereby greater earth loading than a comparable conventional pipe may be imposed without pipe failure.

Also, it is an allied objective of the invention to provide an internally reinforced conduit that incorporates the superior corrosion resistant characteristics of plastics with a unique approach involving a semi-rigid pipe design. It is accordingly a goal of the invention to provide internally reinforced pipe having load/deflection characteristics similar to the surroinding soil by the provision of a reinforcing member designed to more closely match the stress/strain characteristics of the soil than rigid or flexible pipe in the prior art.

It is an important goal of the invention to rely on the buckling resistance of an internally reinforcing stem member to resist deflection. The objective involves providing that the mode of critical failure is buckling of internal reinforcement and not deflection of pipe sidewalls.

It is another object of the invention to provide an extruded plastic conduit having internal reinforcement which allows the imposition of a larger earth loading than a comparably sized conventional pipe and wherein the amount of plastic used per lineal foot is substantially identical to, or less than, the amount used in the conventional pipe. This goal includes re-arranging the pipe cross-section.

It is also an important goal of the invention to provide an internally reinforced plastic pipe which permits a plurality of reinforcing stems for use in isotropic loading conditions, such as a well screen or monitoring well, and eliminate the need for the more costly utilization of stainless steel. This is an important consideration where a high percentage of open area is required to permit inflow of water.

It is an allied objective of the invention to provide an internally reinforced extruded plastic pipe which is capable of sustaining greater loading, even when perforated, than conventional non-reinforced pipe that is non-perforated.

DESCRIPTION OF MODE BEST EMBODYING THE INVENTION

The internally reinforced conduits shown in the Figures incorporate the superior corrosion resistance characteristics of plastics with a new approach to a semi-rigid pipe design. The invention preferably embodies a thermoplastic material which is formed by conventional extruding techniques utilizing polyvinyl chloride (PVC). Also, other well-known thermoplastics may be used in accordance with the invention and include: polyethylene, acrylonitrile butadiene styrene, polybutylene, chlorinated polyvinyl chloride, polypropylene, cellulose acetate butyrate, rubber modified styrene, and ABS-PVC alloys.

Previous improvements in flexible pipe ring stiffness have attempted to increase the flexural strength of the conduit wall. Increases in ring stiffness are accompanied by decreases in ductility and thus greater susceptibility to wall cracking and failures similar to rigid pipe. Earlier attempts to produce a rigid PVC pipe focused on modifications to the modulus of elasticity of the PVC. The inherent creep problem appears to have been the primary obstacle in the development of rigid PVC pipe in recent years.

The internally reinforced conduit design of the invention incorporates the advantages of plastic pipe in that it can be extruded from plastic but it does not suffer from the creep stress relaxation phenomenon caused by flexure of the plastic pipe sidewall. The design involves supporting a vertical load on the pipe via an integral continuous plate-column extending for substantially the full length of the pipe which is produced simultaneously with extrusion of the pipe sidewall. Creep problems are avoided because plastics, specifically PVC, are known to be less susceptible to creep phenomena when loaded in compression. The thickness, and accordingly the buckling resistance, of a stem, plate or plate-column, to be oriented in a vertical position can be proportioned to permit deflections which are similar in magnitude to the anticipated compressibility of the adjacent soil or pipe bedding and backfill. Also, the number of reinforcing stem members required can be calculated and manufactured in the correct amount to meet particular loading conditions, i.e., isotropic or anisotropic. The semi-rigid nature of the pipe disclosed is a significant improvement over extremely rigid pipe such as concrete and clay, and is also an improvement over the various limitations imposed by conventional flexible plastic pipe.

The invention is compatible with many varied pipeline uses. Methane collection pipes, leachate collection pipes, pavement underdrainage conduits, chemical waste lines, mine and dredging tailings drainage pipes, vents, and storm sewers, are typical applications.

Figure 1:
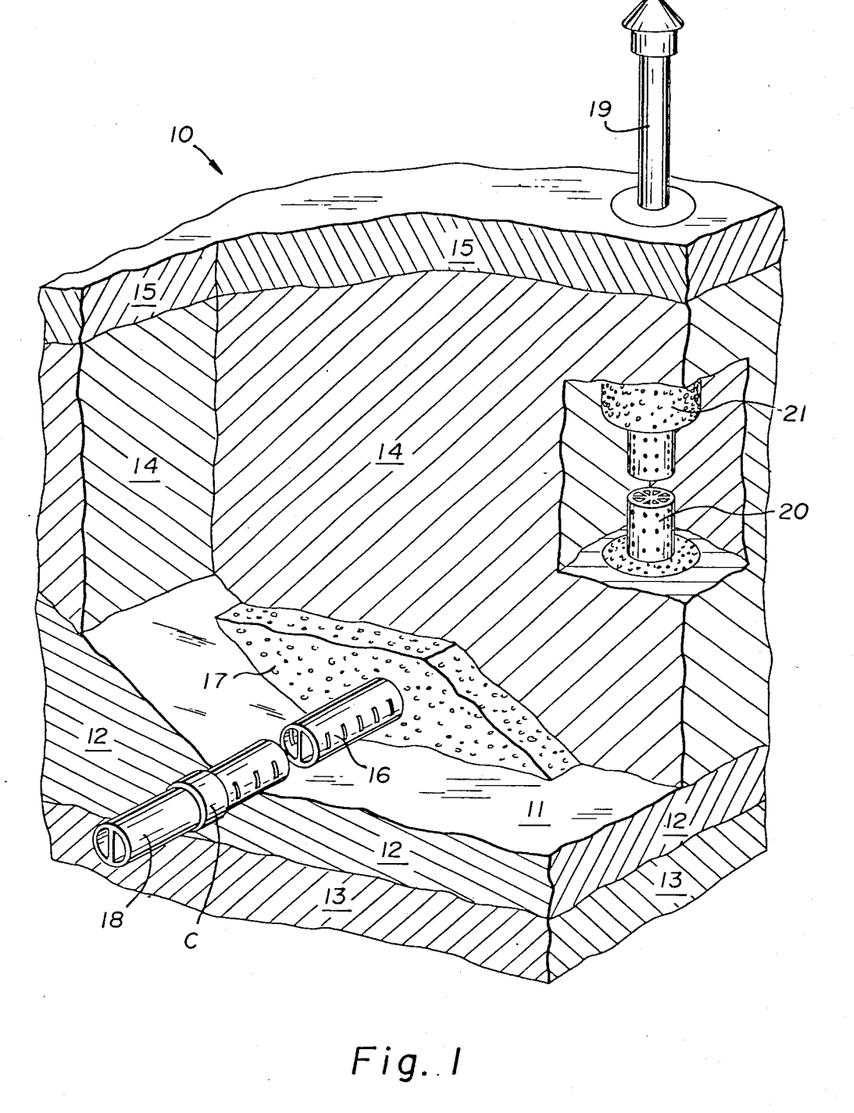
FIG. 1 is a broken-away perspective view of a landfill environment showing the preferred embodiment of the invention for single stem solid wall and single stem perforated pipe experiencing anisotropic loadings, and a multi-stem pipe experiencing isotropic loading.
Figure 2:
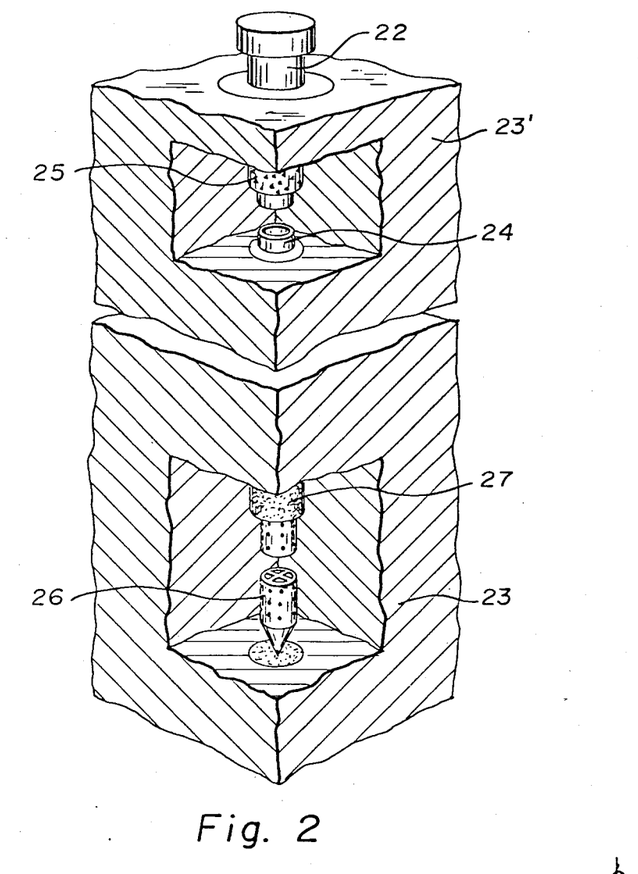
FIG. 2 is a broken-away perspective view of a landfill showing the preferred embodiment of the invention for a two-stem pipe in an anisotropic loading application.
Figure 3:
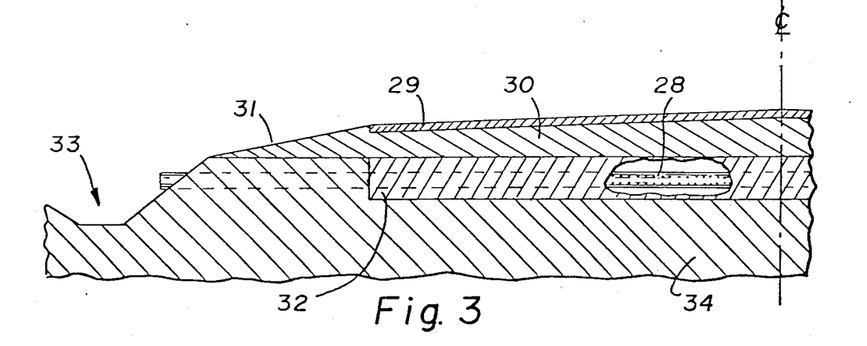
FIG. 3 is a cross-sectional view of a roadway showing an alternate embodiment of the invention for an underdrainage application.

FIGS. 1, 2 and 3 show typical applications for the invention utilizing the preferred embodiment and alternative preferred embodiments involving both solid and perforated pipe in isotropic and anisotropic loading conditions. FIG. 1 shows a refuse landfill 10 which involves excavating to a base 11 at an impermeable soil liner 12. The depth of soil liner 12 is generally set by regulations and enviromental protective guidelines, such that a permeable strata 13 is separated from the refuse 14 by a certain depth of impermeable strata 12. Typically, a final soil cover 15 is placed over refuse 14. Also, daily soil coverings are made incrementally (not shown) as day-by-day filling takes place. Thus, alternating layers of refuse and soil cover result and create high earthloads at base 11.

At base 11 a portion of a leachate collection system is shown wherein perforated pipe 16 is utilized as a collection conduit and is embedded in a gravel filter 17 which provides both a solid particle filter and a protective envelope from sharp objects in refuse 14. This manner of pipe placement is termed a positive projecting mode. Perforated pipe 16 is coupled at C by a conventional flush solvent-welded joint to solid pipe 18. The collected leachate is transported through solid conduit 18 to a drainage sump or treatment facility (not shown) as normally used in refuse landfill construction. Both perforated pipe 16 and solid pipe 18 are internally reinforced in accordance with the invention and have internal reinforcing stems vertically oriented to maximize resistance to buckling as described herein. An additional application of the invention is shown at gas vent 19 wherein a perforated pipe having radial reinforcing stems is vertically oriented and subjected to isotropic conditions from the surrounding refuse 14 and washed gravel filter 21. Washed gravel filter 21, similar to gravel filter 17, provides a protective envelope as well as filtering solids from entering the vent.

FIG. 2 shows another vertically oriented application of the invention wherein a monitoring well 22 is provided for disposition in fill material 23. At upper portions, within final cover material 23', a solid conventional pipe 24 is surrounded by impervious material being grout 25. Solid pipe 24 is the transport conduit for liquids collected through well screen 26 at the bottom, or well-point, of monitoring well 22. Well screen 26 receives fluids from lower portions of the landfill, such as a sump or collection basin, and is surrounded by course clean sand 27, which filters solids from the fluid entering well screen 26 and also provides a protective cushion. Two radial reinforcing stems are provided within well screen 26 to resist failure from the isotropic loading condition.

A most promising application permits the open area of plastic well screen, as in FIG. 2, to be quadrupled over conventional plastic perforated pipe through the incorporation of the internal reinforcing members, while maintaining adequate crushing resistance.

FIG. 3 is yet another application of the invention being a perforated pavement underdrain 28 disposed below a roadway, comprising flexible pavement 29. Pavement 29 is constructed atop embankment 30 which terminates at side slope 31. Pavement underdrain 28 resides in backfill 32 which has replaced an excavated existing soil volume. Water is collected therethrough for transport to ditch 33. Backfill 32 is preferably a graded washed gravel and acts to cushion underdrain 28. FIG. 3 shows half of the roadway cross-section and a substantially mirror-image conformation would exist to the right of, and parallel to, the centerline.

Polyvinyl chloride and the other alternative plastics mentioned above are widely used materials used for plastic pipe formed by the extrusion process. Incorporation of internal reinforming stems to resist pipe deflection is entirely compatible with present plastic pipe extrusion techniques. It will be understood that relatively simple modifications in the molding extruder head would be required to extrude internal stems in conventional plastic pipe extrusion machines.

With reference to FIGS. 4-7, preferred single and multi-stem embodiments of extruded pipe cross-sections are disclosed in accordance with the invention.

Figure 4:
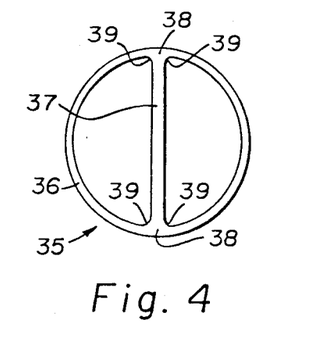
FIG. 4 is a cross-sectional view of the preferred embodiment of the internally reinforced extruded plastic pipe of the invention having a single internal reinforcing stem.

FIG. 4 illustrates the preferred embodiment of the invention for a single reinforcing stem design. The term "stem" is also referred to herein as a reinforcing plate, plate-column, or reinforcing member. Pipe 35 has circular sidewall 36 and reinforcing stem 37 extending between connection points 38 along the sidewall. The reinforcing stem 37 is integrally extruded with sidewalls 36 and curved returns, or fillets 39, at connections 38, to provide a substantially fixed connection point. In the preferred embodiment the nominal inside diameter of the pipe is six inches, and is comparable to a six-inch Schedule 80 PVC pipe. However, the thickness of sidewall 36 is less and the difference in volume is made up in the volume of reinforcing stem 37 and fillets 39, such that the amount of plastic per lineal foot of pipe in the preferred embodiment is substantially identical to that of a six-inch Schedule 80 PVC pipe. This is the single most significant characterizing feature of the invention whereby additional strength is obtained with the same volume of material—but having the cross-section redistributed. In the embodiment shown, stem 37 has a thickness of 0.375 inches and sidewall 36 has a thickness of 0.312 inches. In contrast, a conventional PVC Schdule 80 pipe has a sidewall thickness of 0.482 inches.

With a solid wall design (non-perforated) the loading at failure of pipe 35 is about three times that of a conventional Schedule 80 pipe. In a perforated design, as open area (increases from 1% to 5% of sidewall surface), the deflection failure loading in a conventional Schedule 80 pipe decreases drastically. In pipe 35, since the mode of failure is buckling, the effect of perforations along sidewall 36 is not the significant factor as with conventional pipe. It is estimated that even at 7% open area the loading at failure is greater than a Schedule 80 PVC six-inch pipe, without perforations, can withstand.

Figure 5:
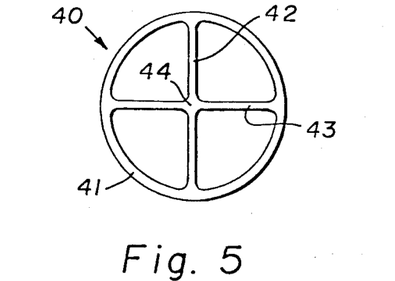
FIG. 5 is a cross-sectional view of the preferred embodiment of the internally reinforced extruded plastic pipe of the invention having two internal reinforcing stems.

FIG. 5 shows internally reinforced pipe 40 having sidewall 41 integrally formed with two radial reinforcing stems 42 and 43 crossing at a 90° intersection at hub 44. Pipe 40 would be most useful in isotropic loading wherein equal pressures surround the pipe sidewall 41, such as for use in gas vent 19 or monitoring well 22 (FIGS. 1 and 2).

Figure 6:
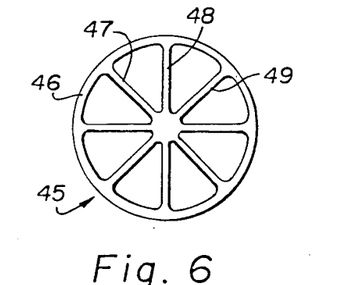
FIG. 6 is a cross-sectional view the preferred embodiment of the internally reinforced extruded pipe of the invention having multiple internal reinforcing stems.

FIG. 6 shows internally reinforced pipe 45 also best used in isotropic loading conditions. Pipe 45 includes sidewall 46 integrally formed with three radially reinforcing stems 47, 48 and 49, having equal angles therebetween.

Figure 7:
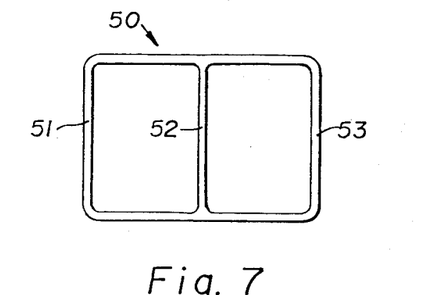
FIG. 7 is an alternate embodiment of the invention comprising, in cross-section, a generally rectangular exterior configuration.

FIG. 7 provides an alternate preferred single-stem embodiment for the invention utilizing a substantially rectangular sidewall configuration for pipe 50. Pipe 50 includes opposite vertical sidewalls 51 and 53 having a parallel plate-like reinforcing stem 52 therebetween. The wall 51, plate 52, and wall 53 provide resistance to buckling when disposed in an orientation parallel to loading, and would be well suited for use, as in FIG. 3, for a pavement underdrain.

Figure 8:
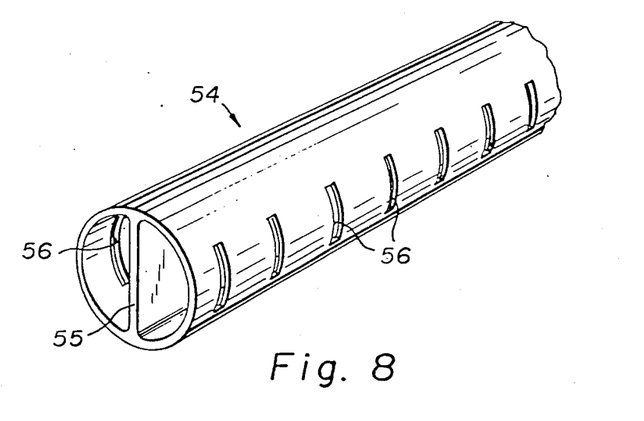
FIG. 8 is a perspective view of a single-stem internally reinforced extruded plastic pipe in accordance with the invention having perforations comprising spaced-apart slots for a collection conduit application.
Figure 9:
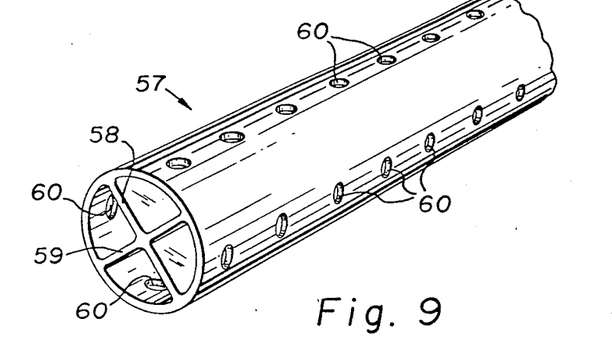
FIG. 9 is a perspective view of a two-stem internally reinforced extruded plastic pipe in accordance with the invention having perforations comprising spaced-apart holes for a collection conduit application.
Figure 10:
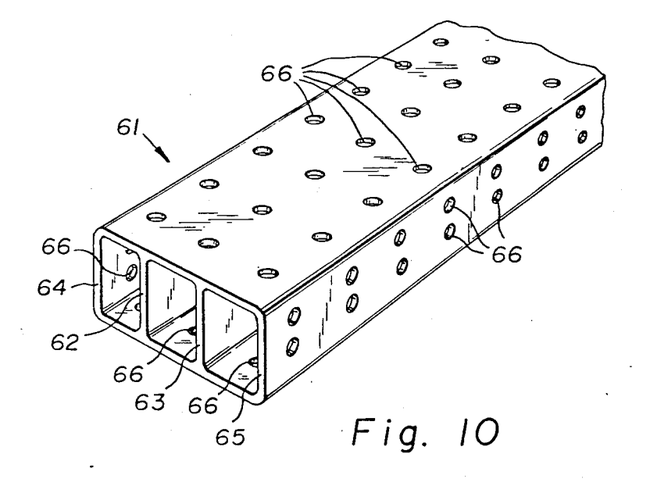
FIG. 10 is a perspective view of a pipe in accordance with the invention having a generally rectangular exterior configuration and two internal reinforcing stems with spaced-apart holes along the pipe for a collection conduit application.

FIGS. 8, 9 and 10 show perspective views of internally reinforced pipe in accord with the disclosure and having perforations for collection and infiltration installations.

FIG. 8 shows the preferred single-stem embodiment wherein perforated extruded plastic pipe 54 includes a single reinforcing stem 55. Perforations 56 open through the sidewall at about a one to two inch center-to-center spacing along sidewall 56 in two rows, one at either side of stem 55, and provide an open area of about 5% of the sidewall outer surface. Pipe 54 is optimally positioned with stem 55 in the direction of, or parallel to, the greatest anisotropic exterior loading, which is almost always vertical, as for example in FIG. 1 with respect to the orientation of perforated pipe 16.

FIG. 9 shows a preferred two-stem embodiment wherein perforated pipe 57 includes two radial reinforcing stems 58 and 59 meeting at substantially right angles for effective use in isotropic loading conditions, such as a monitoring well screen. Perforations comprise four rows of round holes 60, rather than slots as in FIG. 8, each row disposed between stem/wall connection points. Stated another way, perforations are located at both sides of every connection point to grant incoming fluids access to all internal pipe chambers defined between reinforcing members. Many alternate configurations for perforations are within the scope of the invention, as would be clear.

FIG. 10 shows a generally rectangular pipe configuration comprising perforated extruded plastic conduit 61. In this alternate preferred multi-stem embodiment, conduit 61 includes two vertically oriented reinforcing plates, or stems, 62 and 63 between opposing parallel exterior sidewall portions 64 and 65. The stems and sidewall portions resist buckling when disposed in a vertical orientation and subjected to earth or live loading. Conduit 61 is well suited to provide a large volume capacity with a relatively low profile for particular use as a roadway underdrain. In a roadway environment, high earthloading would not usually be as critical a factor as live and impact loading caused by truck or heavy equipment traffic. Internally reinforced extruded plastic conduit 61 offers significant buckling resistance over conventional rectangular rigid pipe and conventional circular plastic pipe and exhibits increased strength in such high live loading environments. Perforation is provided at holes 66 disposed in a plurality of rows and the holes are spaced in regular intervals along conduit 61 and at both sides of all stem/wall connection points to allow entrance of fluids into the entire pipe section.

Perforation shapes, as shown in the Figures, and equivalents, may be made subsequent to pipe extrusion by the manufacturer, or for example, can be saw-cut or drilled by the on-site installer in accord with open area and spacing design specifications. As noted, the perforations should be provided at both sides of each stem/sidewall connection to grant access by fluids to all the pipe chambers in achieving infiltration and collection, from all directions.

The significance of the backfill characteristics and the load deformation response of conventional flexible pipe requires installation procedures necessary to dispose properly graded backfill in a certain compacted density to ensure the required lateral resistance to deformation. The load deformation characteristics of the internally reinforced conduit of the invention with a single vertical stem is dependent upon the vertical orientation of the stem during installation, as would be clear. To achieve the correct orientation, simply painting a line along the exterior of the pipe during manufacturing procedures at the location of the stem/pipe sidewall intersection, together with minimal visual inspection during construction, will be adequate. This installation is more easily accomplished than the requirements for field density (compaction) testing to assure successful performance of conventional flexible plastic pipe, and many types of corrugated metal pipe.

Both the projecting mode, as shown in FIG. 1, and the trench mode (as discussed), burials may be used with the invention. However, the ability to utilize the invention without the necessity for trenching is a distinct advantage in those circumstances where trenching is inconvenient or too costly. Other advantages include direct burial in such materials as refuse and mine tailings where sidewall support is negligible since the pipe can then be simply embedded in a protective granular envelope or geotextile. The protective granular envelope need not be compacted to stringent specifications and would be merely used to filter incoming fluids and also provide a cushion from stress concentrations that might result from rocks and similar rigid pieces within the adjacent mass. Use of pea gravel, a by-product of sand and gravel screening operations, would provide a suitable cushion. This offers a significant economic benefit due to the lesser cost of such material than graded sand and gravel in many geographic locations.

Currently, sharp, angular crushed and graded stone is recommended for plastic pipe backfill to obtain the maximum bedding modulus. In certain geographic areas, e.g., the Gulf Coast of the United States, aggregates for pipe bedding and backfill are unavailable or prohibitively expensive. Rather than hauling backfill from distant locations at a high cost, the invention offers the desirable alternative for the placement of lightweight internally reinforced conduit in conjunction with a lower grade of bedding materials. The use of cohesive soil, free of stones, would often be permissible, thus eliminating the need for granular backfill entirely where solid wall pipe is to be installed.

The incorporation of the internal reinforcing member(s) does not improve the moment of inertia of the pipe cross-section. For example, to increase the moment of inertia about the centroid of the section, additional plastic should be added to the pipe exterior (sidewall) to thicken the pipe wall, as has been done by others in the past. Corrugated high density polyethylene (HDPE) pipe, truss-walled pipe and composition-wall pipe improve the moment of inertia of the pipe section. By comparison, internally reinforced pipe of the present invention does not rely on the moment of inertia of the pipe section, and the accompanying conventional ring stiffness factor, as its primary mode of deflection resistance. The disclosure envisions an actual reduction in pipe sidewall thickness with the inclusion of at least one reinforcing stem. Accordingly, a substantially identical amount of plastic per lineal foot is provided by the invention compared with a corresponding conventional pipe of the same nominal size, which actually achieves increased load resistance.

The internally reinforced conduit herein disclosed relies on the buckling resistance of a reinforcing member to resist deflection. The buckling resistance of the stem(s) is a function of the length, thickness, and modulus of elasticity of the stem and the end constraints. The stem/pipe wall connections (end constraints) significantly contribute to the buckling resistance of the stem.

Testing Procedures

To investigate the actual resistance of internally reinforced pipe to loading, three test samples of internally reinforced pipe were fabricated with a single stem member heat welded at opposite ends to the sidewalls inside a section of circular SDR-26 PVC pipe to simulate extruded pipe with a reinforcing member and fillets. Two specimens had a single bead weld and one specimen had a triple bead weld. One of the single bead welded specimens was a solid wall pipe. The other single bead welded specimen and the triple bead welded specimen were perforated with one percent open area. The extrusion process is expected to yield fillets which are equal to, or stronger than, the triple bead heat welding and is considered to be a matter of refinement of the disclosure. The three sections of reinforced pipe were compressed in a load frame until failure.

Four specimens of conventional circular PVC pipe (ASTM D 1785 Schedule 80) were tested. Three were non-perforated, or solid wall, pipes and the fourth was perforated with one percent open area.

Three specimens of conventional SDR-26 PVC pipe were also tested. Two were non-perforated, or solid wall, pipe and the third was perforated with one percent open area.

All specimens were eight inches long.

The perforation of the test samples for both the conventional and reinforced pipe consisted of single rows of 0.375 inch diameter holes, spaced one inch on center, at opposite sides of the pipe at 90° to the vertical orientation of the pipe during testing, substantially the same arrangement as shown for the slots in FIG. 8.

The reinforced pipe sections made in accordance with the invention had an inside diameter of 6.00 inches, a sidewall thickness of 0.312 inches, and reinforcing stem thickness of 0.375 inches. The Schedule 80 pipe sections had an inside diameter of 5.66 inches and sidewall thickness of 0.482 inches. The internal cross-sectional open area of the internally reinforced pipe was 3% greater than the Schedule 80 pipe. However, the volume of plastic per unit length of pipe was substantially identical (111 cubic inches per foot) due to the stem and weld volumes making up for the difference in sidewall thickness.

The specimens were compressed by the use of conventional testing apparatus of the type specified for flattening tests in accordance with ASTM D 2412-77. The procedure varied slightly from the standard parallel plate-loading test in that the specimens were eight inches long whereas standard specimens are either six or twelve inches in length depending on whether the pipe is conventional thermoplastic or reinforced thermosetting resin pipe. The strain rate was approximately 0.085 inches per minute measured with a dial indicator.

The load and strain recorded readings are tabulated as follows:

| TEST NO. | SPECIMEN | Solid Wall Pipe DEFLECTION (in.) | LOAD (lbs.) | COMMENT |
|---|---|---|---|---|
| 1. | Internally Reinforced Pipe, | 0 | 0 | |
| | Single Bead Weld Both Sides | 0.1 | 4100 | |
| | Plate/Wall Connections | 0.2 | 10400 | |
| | | 0.3 | 12800 | |
| | | 0.332 | 13000 | |
| | | <0.4 | 14000 | Portion of weld bead broke |
| | | <0.5 | 15000 | Max. Load. Test Stopped |
| 2. | SDR-26 | 0 | 0 | |
| | | 0.331 | 500 | |
| | | | 1900 | |
| | | 3.17± | 1800 | Reached strain capacity of test machine |

-continued

| | | Solid Wall Pipe | | |
|---|---|---|---|---|
| TEST NO. | SPECIMEN | DEFLECTION (in.) | LOAD (lbs.) | COMMENT |
| 3. | SDR-26 | 0 | 0 | |
| | | 0.2 | 300 | |
| | | 0.4 | 600 | |
| | | 0.6 | 800 | |
| | | 0.8 | 950 | |
| | | 1.0 | 1050 | |
| | | 2.0 | 1450 | |
| | | 3.0 | 1750 | |
| | | 3.17± | | Reached strain capacity of test machine. |
| 4. | Schedule 80 | 0 | 0 | |
| | | 0.328 | 2250 | ±5% Deflection |
| | | | 6200 | |
| | | 3.17± | 5900 | Reached strain capacity of test machine. |
| 5. | Schedule 80 | 0 | 0 | |
| | | 0.328 | 3300 | ±5% Deflection |
| | | 0.5 | 4250 | |
| 6. | Schedule 80 | 0 | 0 | |
| | | 0.1 | 600 | |
| | | 0.2 | 1200 | |
| | | 0.4 | 2350 | |
| | | 0.6 | 3100 | |
| | | 0.95 | 3800 | |
| | | | 5425 | |
| | | 3.17± | 5000 | Reached strain capacity of test machine. |

| | | Perforated Pipe Two Rows ⅜" Dia. Holes, 1" Centers (1% Open Area) | | |
|---|---|---|---|---|
| TEST NO. | SPECIMEN | DEFLECTION (in.) | LOAD (lbs.) | COMMENT |
| 7. | Internally Reinforced Pipe, Triple Bead Welded Both Sides of Plate/Wall Connections | 0 | 0 | |
| | | 0.05 | 2200 | |
| | | 0.10 | 4600 | |
| | | 0.15 | 10500 | Stem buckling visible. |
| | | 0.20 | 16000 | |
| | | 0.225 | 17200 | |
| | | 0.250 | 17200 | Sudden collapse of pipe. Stem shattered. |
| 8. | Internally Reinforced Pipe, Single Bead Weld Both Sides of Plate/Wall Connections | 0 | 0 | |
| | | 0.05 | 1100 | |
| | | 0.07 | 2300 | |
| | | 0.10 | 5300 | |
| | | 0.15 | 10000 | |
| | | 0.175 | 12000 | |
| | | 0.19 | 12200 | |
| | | 0.20 | 12200 | Failure - bead broke away from stem. |
| 9. | SDR-26 | 0 | 0 | |
| | | 0.1 | 250 | |
| | | 0.2 | 400 | |
| | | 0.4 | 675 | |
| | | 0.6 | 850 | |
| | | 0.8 | 1000 | |
| | | 1.0 | 1100 | |
| | | 2.0 | 1275 | |
| | | 2.9 | 1350 | Reached strain capacity of test machine. |
| 10. | Schedule 80 | 0 | 0 | |
| | | 0.1 | 575 | |
| | | 0.3 | 1875 | |
| | | 0.328 | 2000 | |
| | | 0.4 | 2400 | |
| | | 0.5 | 2875 | |
| | | 0.6 | 3200 | |
| | | | 4175 | Max. load. |

Analysis

In laboratory compression tests on samples of internally reinforced conduit with one percent perforated open area (specimens equivalent to the perforated samples of Schedule 80 pipe,) the internally reinforced conduit yielded three to four times the resistance to pipe failure in the flattening test (Test Nos. 7, 8 and 10). Higher strength was observed with the triple bead weld indicating the relative importance of the connection between the pipe wall and the stem. According to the procedures recommended by the *Handbook of PVC Pipe, Design and Construction*, Uni-Bell Plastic Pipe Association, Dallas, Tex., 1979, the calculated load carrying capacities for perforated Schedule 80 pipe at 10% deflection in accordance with ring stiffness and pipe bedding are tabulated in the following chart.

VERTICAL LOAD CAPACITY OF BURIED SCHEDULE 80 PIPE (PERFORATED 1% OPEN AREA) AT 10% DEFLECTION

| Bedding Type | Assumed Soil Modulus E' (psi) | Vertical Load (psi) |
|---|---|---|
| Soft Clay | 0 | 69.7 |
| Dumped Clean Sand & Gravel | 200 | 77.7 |
| Moderately Compacted Sand & Gravel or Very Stiff Clay Fill | 1000 | 110 |
| Well Compacted Sand or Gravel | 2000 | 150 |
| Compacted Crushed Stone | 3000 | 195 |

In comparison, the internally reinforced triple bead welded pipe withstood a vertical load of 17,100 lbs. (failure at 17,200 lbs., see Test No. 7), which equals about 322 psi (factor of safety equals 1.0) neglecting any support provided by bedding.

Although embedding the conventional pipe in compacted granular material would increase the load carrying capacity, the reinforced pipe without bedding provides greater resistance to deflection than a conventional pipe with bedding having a soil modulus (E') of 3000 and will allow for slightly more open area than the Schedule 80 pipe at 10% deflection. Whereas a greater percentage of wall perforation can be provided by the invention without loss of load carrying capacity, the Schedule 80 pipe with the same percentage open area would have a reduced load carrying capacity and greater deflection.

The buckling resistance of the three internally reinforced conduit samples was compared to theoretical estimates. Plastic weld beads along opposite sides of the stem at the sidewall connection had a volume of plastic such that the total volume of the stem, circular sidewall and beads matched the volume of the comparable Schedule 80 PVC pipe (actual outside diameter=6.63 inches and inside diameter=5.66 inches). This allowed a direct strength comparison. Load to failure of the stem was predicted from the following Euler formula as presented in Formulas for Stress and Strain, Roark & Young, McGraw-Hill, 1975, at page 550:

$$\sigma'_o = \frac{KE}{1 - \nu^2} (t/b)^2$$

The following values were used in the analysis:
E=400,000 psi (modulus of elasticity)
v=0.38 (Poisson's Ratio)
t=0.375 inches (stem thickness)
b=8.0 inches (test sample length)
K=5.8 (according to the standard tables provided by Roark & Young, at page 550, and assuming an ideal clamped connection between the stem and pipe wall)

A major objective of the laboratory testing procedure was to determine K by experiment. Using the modulus of elasticity and Poisson's Ratio above, test loading at about 10,500 lbs. showed the stems in both perforated and non-perforated pipes beginning to buckle. This resulted in the determination that K=3.41. The stem/pipe connection achieved by heat welding was effectively 58% clamped (3.4/5.8×100%).

In comparison the deflection failures (about 30% deflection) of Schedule 80 pipe specimens were reached at no greater than 5,000 lbs. for solid wall PVC samples and no greater than 4,000 lbs. for the perforated samples.

The extrusion process will be stronger than the heat weld connection since the stem and sidewall are to be integrally formed and the stem/pipe connection would include fillets having about the same amount of plastic as the weld beads provided in the test specimens along opposite sides of the connection. It is estimated that extruded integral reinforced pipe will provide at least the 58% clamped condition evident in the triple bead specimens tested. The test results indicated that the load capacity of differing stem sizes can be reasonably predicted with the Euler formula. It will be appreciated that multiple radial stems can be analyzed by variations of the Euler formula presented in *Formulas for Stress and Strain*.

In considering side-loading resistance to buckling of internally reinforced conduit, where the external loading conditions are isotropic, for example a monitoring well, multiple internal reinforcing stems would be effective to resist the isotropic loading that acts essentially equally at all points along the circumference of the pipe sidewall. Under anisotropic conditions, for example high landfills, or under flexible pavement subject to high wheel loads, a single vertical stem, as shown by Test Nos. 1, 7 and 8, is satisfactory for both perforated and solid wall pipe.

The resistance of the internally reinforced pipe to failure by buckling of the wall under side-loading is predicted by the following formula from the above-recited *Formulas for Stress and Strain:*

$$p' = Et^2/4r^3$$

Where:
p'=the critical loading (limit of elastic stability)
E=400,000 psi (modulus of elasticity)
t=sidewall thickness
r=radius of curvature This analysis permits the investigation of the loading on the shell between the constraints (pipe/sidewall intersections) with respect to the effects of misalignment of the stem during installation. In essence the analysis is of half the pipe being subjected to loading perpendicular to a line extending between the two stem connection points.

Analysis of the design having a wall thickness of 0.312 inches, inside diameter of 6.00 inches, stem thickness of 0.375 inches, and length of 8.00 inches, without perforations, in accordance with the above formula, indicates the critical loading between constraints to be 131 psi or 10,433 pounds per lineal foot of pipe (6,958 lbs. on eight inch long test sections).

Considering the at-rest earth pressures on the pipe resulting from deep burial, the maximum load on the side of a properly oriented internally reinforced pipe will be a maximum of one-half the vertical load in accordance with the previously discussed generally accepted theory and measurements. The walls of a buried section of test pipe would begin to buckle under a vertical load of about 13,900 lbs. (2×6,958 lbs.). The ultimate vertical load leading to sidewall collapse on the eight inch long internally reinforced solid weld pipe specimen is estimated to be about 20,000 lbs. (13,900 lbs. increased by 50% accounting for the load capacity between the onset of buckling and ultimate failure as indicated by the previously discussed laboratory tests on the internally reinforced test sections). This mode of failure assumes no bedding support. Practically, a sidewall failure is only feasible if the pipe is misaligned during installation in a weak soil embedment ($E'=0$) and the stem is errantly located horizontally. The problem does not exist even if the bedding is very weak, so long as the pipe is properly oriented. Potential for tensile failure of the stem is considered to be highly unlikely.

In practicing the invention it will be clear that any direct comparisons of various types of internally reinforced pipe to conventional pipe, and specifically their ability to resist loading, must include consideration of the factors of safety incorporated in each stated pipe strength value. The factors of safety against failure of structure foundations, highway embankments, earth dams and retaining walls, are generally in the range of 1.5 to 3.0 for normal loading. Structures such as these could rely on the invention for buried internally reinforced drainage conduits to assure soil stability. The factor of safety against conduit collapse would also be in the range of 1.5 to 3.0. Such considerations are critical and many roadway pavements and embankment failures are related to a lack of adequate underdrainage due to underdesigned internal drainage systems. The invention offers significant benefits in such critical applications.

*The Handbook of PVC Pipe, Design and Construction,* Unibell Plastic Pipe Association, 1979, lists corrugated steel pipe (cmp) as beginning reverse curvature (a point just at the limit of complete crushing, similar to the ultimate strength) at a deflection of about 20%. Present design of these type conduits is based on an abitrary limit of 5% deflection to thereby incorporate a 4.0 factor of safety against collapse. SDR-35 PVC pipe is reported as reversing curvature at not less than 30% deflection.

During laboratory testing, in accordance with the procedure set forth, it has been observed in testing two samples (Test Nos. 2 and 3) that reverse curvature of a standard six-inch SDR-26 (ASTM 2241) PVC pipe began at approximately 40% deflection (height of deflected pipe compared to height before testing). For conventional Schedule 80 PVC pipe (Test Nos. 4, 5 and 6), reverse curvature began at about slightly over 30% deflection. In accordance with common practice, a 7.5% deflection limit has been proposed by plastic pipe manufacturers for PVC pipe to provide a factor of safety equivalent to the abitrarily selected value of 4.0 used for corrugated steel pipe design. A 10% allowable deflection, which includes a factor to account for long term creep, is used in generating the PVC pipe load capacities listed in the *Handbook of PVC Pipe* and corresponds to a factor of safety of 3.0 to 4.0 against collapse.

The critical buckling load for the internally reinforced pipe of the invention, applying the Euler formula, was determined from testing to have a K value of 3.41. This loading is not the ultimate load which the internally reinforced pipe could sustain. The ultimate loads, at which collapse of the laboratory test specimens occurred, were 20% to 75% higher than the observed critical buckling load of about 10,500 lbs. It will be appreciated that an extruded pipe will have a higher critical load (and ultimate load) because the connection between the stem and sidewall produced by the extrusion process will be superior to that of the test specimens (the K value will be higher).

The ultimate strength of internally reinforced conduit test sections with a triple bead weld was observed to be approximately 3 times $\frac{1}{2}$ the critical buckling stress. A continuous solid wall internally reinforced conduit with a 0.312 inch sidewall thickness, a 0.375 stem thickness, and having a 6.00 inch inside diameter would reach the state of critical buckling under a vertical soil pressure of 168 psi. Applying a factor of safety of 3, or $\frac{1}{3}$ the buckling stress, the allowable vertical soil pressure without bedding is 84 psi. Even with this conservative design value, it represents a 20% improvement over Schedule 80 pipe with no sidewall support and an 8% improvement over poorly bedded pipe incorporating an $E'=200$ bedding coefficient. As the quality of bedding improves, the conventional conduit and the internally reinforced conduit would have approximately equal resistance to deflection. However, internally reinforced perforated collection conduit in accord with the disclosure, when subjected to earth pressures or surcharges with or without high strength bedding, exhibits significantly higher strength than conventional pipe. As the percent of open wall area is increased, the relative difference between load capacity of the disclosed pipe and conventional pipe is clearly increased. This increase is achieved with substantially identical amounts of plastic per lineal foot of pipe.

It is intended that the invention encompass a broad range, including equivalents thereof, and is not to be considered as limited by the preferred embodiment disclosed in the Figures and description herein.

ACHIEVEMENTS OF THE INVENTION

The internally reinforced extruded plastic conduit of the invention is superior to conventional buried plastic pipe, truss pipe and various high density polyethylene pipe when any of the following conditions are present:

1. The performance of the conventional pipe depends upon the strength of the granular backfill and degree of compaction, i.e., minimum $E'=1000$;
2. Perforations are to be incorporated in the pipe sidewall for collection or infiltration;
3. Corrosive ground water is present and the locally available aggregate for bedding is carbonate;
4. Granular backfill is not locally available;
5. Access to construction sites limits the use of construction equipment and granular pipe bedding is required, and,
6. Trench mode installation is inconvenient or not feasible, such as in a landfill application where utilizing more equipment is cost prohibitive.

While this listing is not to be understood as comprehensive, distinct advantages in these practical considerations illustrate the significant benefits offered.

Further, internally reinforced extruded plastic conduit in accordance with the invention is uniquely adaptable to the following conditions which have posed serious and severe problems for all known conventional products (except possibly stainless steel which inherently is more costly):

1. Deep well screen installations requiring large open areas and resistance to corrosion;
2. Leachate collection systems under high landfills, hazardous waste and mine tailings piles;
3. Methane gas collection wells at landfill sites; and,
4. Shallow flexible pavement and railroad ballast underdrainage collection conduits requiring high resistance to deflection under live loads.

The internally reinforced conduit of the invention provides resistance to deflection and collapse by the utilization of one or more continuous plate-like stems acting in compression which fail by buckling rather than tension. The reinforced conduit disclosed can be manufactured by simple adaptation of well-known extrusion processes. For equal volumes of plastic per lineal foot, the inventive pipe can sustain far greater loading than conventionally designed plastic pipe. It is an important achievment that the role of bedding/backfill is to provide a cushion from stress concentrations rather than as a supporting medium.

What is claimed is:

1. An internally reinforced pipe for use in a buried environment comprising extruded synthetic resin thermoplastic having a modulus of elasticity no less than about 35,000 p.s.i., the pipe having wall means, defining the external shape of the pipe and internal reinforcing plate means having opposite ends thereof integrally formed with the wall means at connections thereto, the connections forming end contraints for the reinforcing plate means and said reinforcing plate means extending generally in a plane between said connections for substantially the full length of the pipe, said connections and the reinforcing plate means designed whereby to cooperatively act so that the design loading strength of the pipe is defined by the critical buckling strength of said reinforcing plate means so that when the pipe is used in buried environments the pipe provides a greatest resistance to loading failure upon orienting the plate means substantially parallel to the direction of maximum loading along the pipe whereby the critical mode of pipe failure is by buckling of the plate means rather than solely by deflection of the wall means and wherein said pipe exhibits semi-rigid response characteristics to loading therealong.

2. An internally reinforced pipe as in claim 1 wherein the wall means is circular in cross-section.

3. An internally reinforced pipe as in claim 2 wherein said reinforcing plate means extends radially of the circular wall means.

4. An internally reinforced pipe as in claim 1 wherein the wall means includes non-circular curved wall portions in cross-section.

5. An internally reinforced pipe as in claim 1 wherein the connections include integral fillet means along both sides of the reinforcing plate means.

6. An internally reinforced pipe as in claim 1 wherein the wall means includes two opposing parallel wall portions, said reinforcing plate means being spaced therebetween and arranged generally parallel thereto.

7. An internally reinforced pipe as in claim 1 wherein said wall means includes spaced-apart openings therethrough.

8. An internally reinforced pipe as in claim 7 wherein the openings are located along said wall means at both sides of each plate means connection thereto.

9. An internally reinforced pipe as in claim 8 wherein the openings are spaced apart at regular intervals along the pipe.

10. An internally reinforced pipe as in claim 9 wherein the openings are formed in linear rows extending lengthwise of the pipe for substantially the full length thereof.

11. An internally reinforced pipe as in claim 1 wherein the reinforcing plate means has a thickness no less than the thickness of the wall means.

12. An internally reinforced pipe as in claim 1 wherein said plate means generally defines a plane and said pipe being symmetric about said plane.

13. An internally reinforced pipe as in claim 1 wherein said plate means and wall means form at least two pipe chambers extending for substantially the full length of the pipe.

14. An internally reinforced pipe as in claim 1 wherein said pipe includes a plurality of parallel spaced-apart reinforcing plate means.

15. A semi-rigid pipe for use in buried environments comprising an extrusion of synthetic resin thermoplastic material having a modulus of elasticity no less than 35,000 p.s.i., outer wall means and internal reinforcing plate means having ends thereof integrally connected to the wall means, said plate means being arranged generally in a plane between said connections, the connections forming end constraints for the plate means, said pipe intended to be oriented with the reinforcing plate means generally parallel to the direction of a maximum loading acting along the pipe for achieving greatest resistance to loading failure, the connections and the plate means designed whereby to cooperatively set under loading so that the loading capacity of the pipe is determined by the critical buckling strength of the plate means wherein the critical mode of pipe failure is by buckling of the reinforcing plate means and the pipe exhibits semi-rigid response to loading.

16. In an extruded synthetic resin thermoplastic pipe section having wall means defining the external boundary of the pipe, the improvement comprising integral reinforcing means, said reinforcing means comprising at least one generally plate-like stem having ends integrally formed with the wall means at connections thereto, the connections being end constraints for the stem, the stem extending for substantially the full length of the pipe section, whereby the pipe section is capable of being oriented to dispose the stem parallel to the direction of maximum stress to be imposed in a buried environment, said stem and connections being sized and formed to cooperatively act under loading to provide a critical buckling strength of said stem, said pipe characterized by having a design loading strength defined by the critical buckling strength of said stem whereby said pipe behaves semi-rigidly to loading and the critical mode of failure is by stem buckling rather than deflection of the wall means alone, said stem forming at least two pipe chambers, each chamber having a different portion of the wall means forming a boundary thereof, whereby said wall means is thereby capable of including openings to enable each chamber to communicate exteriorly of the pipe section through openings opening thereto.

17. An internally reinforced pipe comprising extruded synthetic resin thermoplastic material intended for use in buried environments and surcharged buried environments, said pipe having a modulus of elasticity of no less than 35,000 p.s.i. and exhibiting semi-rigid behavior during loading, the pipe substantially eliminating reliance upon surrounding media for resistance to loading, wherein buckling of internal reinforcement means, rather than pipe wall deflection alone, is the critical mode of failure, said pipe having wall means defining the outer shape of the pipe and the internal reinforcement means comprising at least one reinforcing plate having opposing long ends thereof being integrally formed with the wall means at connections thereto and thereby forming at least two separate pipe chambers, each chamber having a different portion of the wall means as a boundary thereof, the connections to the wall means forming end contraints for the reinforcing plate, for achieving greatest resistance to loading failure, said pipe to be buried having said reinforcing plate oriented parallel to the direction of a maximum loading on the pipe, wherein said connections and reinforcing plate are formed to cooperatively act under loading to achieve a critical buckling strength for the plate that is the maximum loading strength of the pipe.

18. An internally reinforced pipe as claimed in claim 17 wherein said pipe comprises a plurality of parallel spaced-apart reinforcing plates.

19. An internally reinforced pipe as claimed in claim 17 wherein said pipe includes collection means comprising openings through said wall means arranged at locations therealong whereby each said chamber communicates exteriorly of the pipe through openings opening thereto.

20. An internally reinforced pipe for use in buried environments having substantially isotropic loading forces acting around the pipe, said pipe comprising an extruded synthetic resin thermoplastic material having a modulus of elasticity of no less than 35,000 p.s.i., outer wall means being circular in cross section, a plurality of radial internal reinforcing stems having ends thereof integrally formed with the wall means at connections thereto, said stems each extending generally in a plane between a pair of connections, the connections forming end constraints for the stems, said stems co-extending for substantially the full length of the pipe, the reinforcing stems forming a plurality of substantially equal-sized pipe chambers, each said chamber having a separate portion of the wall means as a boundary thereof, and said reinforcing stems and connections therefor designed to cooperatively act under loading to provide a critical buckling strength for the stems, said pipe having a design loading strength defined by said critical buckling strength for generally isotropic loading around the pipe, whereby said pipe exhibits semi-rigid response to said loading and substantially eliminates reliance on surrounding backfill media to resist failure.

21. An internally reinforced pipe as claimed in claim 20 wherein said pipe is capable of use as a collection pipe and includes openings through said wall means, each said pipe chamber associating with openings opening thereto.

* * * * *

UNITED STATES PATENT AND TRADEMARK OFFICE
CERTIFICATE OF CORRECTION

PATENT NO. : 4,650,367

DATED : March 17, 1987

INVENTOR(S) : Daniel P. Dietzler

It is certified that error appears in the above-identified patent and that said Letters Patent are hereby corrected as shown below:

At Col. 22, line 40, please delete the word "set" and insert therefor the word — act — .

Signed and Sealed this

Third Day of May, 1988

Attest:

DONALD J. QUIGG

*Attesting Officer*  *Commissioner of Patents and Trademarks*